United States Patent [19]

Touhsaent et al.

[11] Patent Number: 5,093,194
[45] Date of Patent: Mar. 3, 1992

[54] ORIENTED MULTILAYER HEAT SEALABLE PACKAGING FILM

[75] Inventors: Robert E. Touhsaent, Fairport; A. Michael Nahmias, Victor; George Cretekos, Macedon, all of N.Y.

[73] Assignee: Mobil Oil Corporation, Fairfax, Va.

[21] Appl. No.: 430,201

[22] Filed: Nov. 1, 1989

[51] Int. Cl.$^5$ ............................................. B32B 27/00
[52] U.S. Cl. ................................... 428/349; 428/414; 428/476.3; 428/484; 428/518; 428/520; 428/353
[58] Field of Search ............... 428/349, 353, 414, 518, 428/476.3, 484, 520; 156/244.11

[56] References Cited

U.S. PATENT DOCUMENTS

| | | | |
|---|---|---|---|
| 3,719,629 | 3/1973 | Martin et al. | 260/33.2 |
| 3,753,769 | 8/1973 | Steiner | 117/122 |
| 4,214,039 | 7/1980 | Steiner et al. | 428/414 |
| 4,439,493 | 3/1984 | Hein et al. | 428/414 |
| 4,447,494 | 5/1984 | Wagner, Jr. et al. | 428/349 |
| 4,564,558 | 1/1986 | Touhsaent et al. | 428/349 |

Primary Examiner—Edith L. Buffalow
Attorney, Agent, or Firm—Alexander J. McKillop; Charles J. Speciale; Michael J. Mlotkowski

[57] ABSTRACT

An oriented heat sealable multilayer structure. The structure comprises a substrate having a first surface and a second surface, the substrate comprising a polyolefin film; a polymeric heat sealable layer on the first surface of the substrate, the layer comprising a polymeric material selected from the group consisting of a terpolymer of ethylene, propylene and butene-1, a random copolymer of ethylene and propylene, and blends thereof; a primer coating on the second surface of the substrate; and a water vapor and gas barrier layer on the primer coating, the water vapor and gas barrier layer selected from the group consisting of a vinylidene chloride copolymer containing at least about 50% of vinylidene chloride and an interpolymer comprising a minor amount of acrylic acid, methacrylic acid or mixtures thereof and a major amount of neutral monomer esters comprising methyl acrylate, ethyl acrylate, methyl methacrylate or mixtures thereof. A method for producing the heat sealable multilayer film structure is also provided.

19 Claims, No Drawings

ORIENTED MULTILAYER HEAT SEALABLE PACKAGING FILM

FIELD OF THE INVENTION

This invention relates to a flexible multilayer heat sealable general purpose packaging film and to a method of forming the same.

BACKGROUND OF THE INVENTION

In the packaging of certain types of foods, such as cookies, potato chips, and the like, it is common practice to employ a multilayer film having two or more polymeric layers wherein one of the layers is known to be an effective heat seal layer. In the packaging process, a supply of such a multilayer film can be shaped into a tube in a vertical form and fill machine. Marginal regions of the heat seal layer are brought into face to face relationship and heat sealed together. Thereafter, the packaging machine automatically forms a heat seal and makes a horizontal severance across the bottom of the bag. Next, product is dispensed into the open end of the tube and, thereafter, a second horizontal seal is effected across the tube with a simultaneous severing through the tube to result in a product packaged in a tube, heat sealed at both ends and along one seam at right angles to the end seals. While the food or other product is being dispensed into the package, air is also present in the package and this air assists in protecting and cushioning the product during subsequent shipment of the finished packages. During shipment of the product, particularly with larger size bags, e.g., those containing 6 ounces of product, the bags have a tendency to split or burst at the end seals.

The employment of vinylidene chloride polymers as thin coatings for oriented thermoplastic films such as polypropylene film has been recognized in the art as an effective means of increasing the heat sealability of such films and additionally increasing the resistance of the films to the transmission of gases and vapors. This latter characteristic is particularly useful when such films are employed to package products which are sensitive to, or attacked by, oxygen or moisture.

A multilayer wrapping film of the type having the above-mentioned utility is described in U.S. Pat. No. 4,214,039, the subject matter of which is, in its entirety, incorporated by reference herein. U.S. Pat. No. 4,214,039 describes a packaging film structure comprising a polypropylene film substrate having a heat sealable vinylidene chloride polymer containing at least 50 percent by weight of vinylidene chloride. In between the polypropylene film and the vinylidene chloride polymer is a primer coat which consists of the reaction product of an acidified aminoethylated vinyl polymer and an epoxy resin. This primer coat enhances the bond strength between the polypropylene and the heat sealable vinylidene chloride polymer.

U.S. Pat. No. 4,439,493 discloses an oriented heat sealable structure which comprises a polyolefin film substrate, a layer consisting essentially of a random copolymer of ethylene and propylene having from about 0.5% to about 6% by weight of ethylene on at least one surface of the substrate, a primer coating on at least one surface of the random copolymeric layer and a heat sealable layer on the primer coating, wherein the heat sealable layer comprises an interpolymer comprising a minor amount of acrylic acid, methacrylic acid or mixtures thereof and a minor amount of neutral monomer esters comprising methyl acrylate, ethyl acrylate or methyl methacrylate. U.S. Pat. No. 4,439,493 is incorporated by reference in its entirety for all that it discloses.

U.S. Pat. No. 4,447,494, incorporated by reference in its entirety, discloses another oriented heat sealable structure, this one comprising a polyolefin film substrate, a layer consisting essentially of a random copolymer of ethylene and propylene having from about 0.5% to about 6% by weight of ethylene on at least one surface of the substrate, a primer coating on at least one surface of the random copolymeric layer and a heat sealable layer on the primer coating, wherein the heat sealable layer comprises a vinylidene chloride copolymer containing at least 50% by weight of vinylidene chloride.

U.S. Pat. No. 4,564,558 discloses a multilayer oriented heat sealable structure, comprising a polyolefin film substrate, a layer comprising a terpolymer of propylene with ethylene and butene-1, a primer coating on at least one surface of the terpolymer layer and a heat sealable layer on the primer coating, wherein the heat sealable layer is selected from the group consisting of a vinylidene chloride polymer layer and an acrylic polymer layer. U.S. Pat. No. 4,564,558 is incorporated by reference in its entirety for all that it discloses.

Despite these advances in the art, there exists a need for other multilayer heat sealable structures having improved properties.

SUMMARY OF THE INVENTION

In accordance with the present invention there is provided an oriented heat sealable multilayer structure. The structure comprises a substrate comprising a polyolefin film having a first surface and a second surface; a polymeric heat sealable layer on the first surface of the substrate, the heat sealable layer comprising a polymeric material selected from the group consisting of a terpolymer of ethylene, propylene and butene-1, a random copolymer of ethylene and propylene, and blends thereof; a primer coating on the second surface of the substrate; and a water vapor and gas barrier layer on the primer coating, the water vapor and gas barrier layer selected from the group consisting of a polyvinylidene chloride containing at least about 50% of vinylidene chloride monomer and an interpolymer comprising a minor amount of acrylic acid, methacrylic acid or mixtures thereof and a major amount of neutral monomer esters comprising methyl acrylate, ethyl acrylate, methyl methacrylate or mixtures thereof.

A method for producing a heat sealable multilayer film structure is also provided. The method comprises coextruding a substrate comprising a polyolefin film with a polymeric heat sealable layer, the polymeric heat sealable layer consisting essentially of a material selected from the group consisting of a terpolymer of ethylene, propylene and butene-1, a random copolymer of ethylene and propylene, and blends thereof; biaxially orienting the coextrudate; applying a primer coating on the surface of the polyolefin substrate; and applying a water vapor and gas barrier layer on the primer coating, the water vapor and gas barrier layer selected from the group consisting of a polyvinylidene chloride containing at least about 50% by weight of vinylidene chloride monomer and an interpolymer comprising a minor amount of acrylic acid, methacrylic acid or mixtures thereof and a major amount of neutral monomer esters comprising methyl acrylate, ethyl acrylate, methyl methacrylate or mixtures thereof.

Accordingly, it is an object of the present invention to provide an oriented polyolefin film which can be heat sealed.

It is another object of the present invention to provide an oriented polyolefin film having low gas and vapor transmission characteristics for use in the packaging of foods.

It is a further object of the present invention to provide a multilayer oriented film structure having excellent barrier properties and reduced blocking tendencies.

It is yet another object of the present invention to provide a multilayer oriented film structure having adequate seal range and excellent bonding adhesion when laminated with polyethylene to a second film.

It is still a further object of the present invention to provide a multilayer oriented film structure for use in the packaging of foods having excellent transparency characteristics.

Other objects, aspects and the several advantages of the present invention will become apparent to those skilled in the art upon a reading of the specification and the claims appended thereto.

DETAILED DESCRIPTION OF THE INVENTION

The polyolefins contemplated as the substrate or core material of the subject film structure include polyethylene, polypropylene, polybutene, and copolymers, terpolymers and blends thereof. Particularly preferred is an isotactic polypropylene containing at least 80 percent by weight of isotactic polypropylene. It is preferred that the polypropylene have a melt flow index of from about 1 to about 8 g/10 minutes.

The ethylene-propylene random copolymer contemplated herein as a material for use in the heat sealable layer to be coextruded with the base polyolefin, is conveniently formed by the simultaneous polymerization of the respective monomers. Effective formation of a random copolymer of ethylene and propylene is accomplished when the ethylene is present with polypropylene in an amount sufficient to result in from about 0.3 to about 10 percent by weight of ethylene in the resulting copolymer. This system is characterized by the random placement of the respective monomer units along the polymer chain. This is in contrast with a block copolymer of ethylene and propylene formed by sequential polymerization of the respective monomers. The feeding of the monomers in forming a block copolymer is controlled so that the monomer employed in one stage of the sequential polymerization is not added until the monomer employed in the preceding stage has been at least substantially consumed thereby insuring that the concentration of the monomer remaining from that preceding stage is sufficiently low to prevent formation of an excessive proportion of soluble random copolymer. The copolymers can have a melt flow index ranging, generally, from about 2 to about 15 g/10 minutes at 446° F. and preferably from about 3 to about 12 g/10 minutes. The crystalline melting point is usually from about 248° F. to about 300° F. and the number average molecular weight range is from about 25,000 to 100,000. The density of the copolymer will usually range from about 0.87 to about 0.92 g/cm³.

The terpolymers contemplated herein as materials which may be selected for the heat sealable layer to be coextruded with the base polyolefin are comparatively low stereoregular polymers. The terpolymers can have a melt flow index at 446° F. ranging from about 2 to about 16 g/10 minutes and preferably from about 3 to about 12 g/10 minutes. The crystalline melting point can range from about less than 250° F. to somewhat greater than 271° F. The terpolymers can range in average molecular weight from about 25,000 to about 100,000 and have a range of densities from about 0.87 to 0.92 gm/cm³. The terpolymers will predominate in propylene and the ethylene and butene-1 monomers can be present in a mole percentage range of about 0.3:1.0 to about 1.0:0.3, in relation to each other.

It is to be understood that blends of the aforementioned random copolymer of ethylene and propylene and the terpolymer of ethylene, propylene and butene-1 are useful in forming the polymeric heat sealable layer for coextruding with the base substrate layer and are within the scope of this invention. In general, when blends of the terpolymer and copolymer are used, the blends will contain from about 10 to about 90 weight percent of the terpolymer, preferably from about 40 to about 60 weight percent, the balance being made up of the ethylene-propylene random copolymer.

Preferred for use as the base substrate layer are homopolymers of propylene. Propylene homopolymer is a well-known, commercially available polymer obtained by the stereoregular polymerization of propylene based on the use of Ziegler-Natta catalysts. Such catalysts generally are reaction products of an organometallic compound belonging to Groups IA to IIIA with a compound of a transition metal of Groups IVB to VIII. Propylene homopolymers and the preparation thereof are described in greater detail by G. Crespi and L. Luciani in "Olefin Polymers (Polypropylene)," *Kirk-Othmer Encyclopedia of Chemical Technology*, Third Edition, John Wiley & Sons, New York (1981), Volume 16, pages 453–469, the entire contents of which are incorporated by reference. Particularly preferred are propylene homopolymers having a melting point range of from about 321° F. to about 336° F. As mentioned, such materials are commercially available.

The preferred terpolymers for use as the coextruded heat sealable layer, or as part of a blend in the formation of same, are commercially available materials. Preferred terpolymers are those which contain no more than about 10 percent ethylene and no more than about 10 percent butene-1, the balance of the terpolymer consisting essentially of polypropylene. Such commercially available terpolymers will generally contain from about 1 to about 8 percent by weight of ethylene and from about 1 to 8 percent by weight of butene-1, having melting points from about 255° F. to about 266° F. A particularly preferred terpolymer for use in the practice of the present invention is known to have an ethylene monomer content of about 5 percent and a butene-1 monomer content also of about 5 percent. A still more particularly preferred terpolymer is known to have an ethylene monomer content of about 1% and a butene-1 monomer content of about 8 percent. As mentioned, such terpolymers are commercially available.

Preferred copolymers for use as the coextruded heat sealable layer, alone, or as part of a blend, are also commercially available materials. Particularly, preferred is a 3.5 percent ethylene content random copolymer, as well as a 4.0 percent ethylene content random copolymer. Another acceptable commercially available copolymer is a 1.5 percent ethylene content copolymer.

In preparing the multilayer structure of the present invention, the polypropylene substrate and the polymeric heat sealable layer consisting essentially of a terpolymer of ethylene, propylene and butene-1, a random copolymer of ethylene and propylene or a blend thereof, are coextruded so that the polymeric heat sealable layer is from about 2 to about 12 percent of the total thickness of the two layers. In preparing the coextruded film it has been found advantageous and convenient to recycle certain quantities of scrap extrudate back into the base homopolymer of propylene. Thus, the homopolymer can have from 0 percent to about 15 percent of terpolymer, copolymer or copolymer-terpolymer blend therein.

It has been found that the water vapor and gas barrier layer contemplated herein does not adhere well to polyolefin film surfaces, even when such surfaces have been subjected to well known pretreatment operations, such as, treatment by corona discharge, flame or oxidizing chemicals. It has been found, however, that the use of certain primer layers intermediate between the water vapor and gas barrier layer and the polyolefin substrate surface provides a high level of adherence.

The system contemplated for the formation of the multilayer packaging material of the present invention involves the use of three layers applied in succession to the selected substrate layer; in other words, a four layer system is contemplated. For example, when the substrate layer is polypropylene, one surface of the polypropylene film will have coextruded to itself a heat sealable layer of polymeric material which consists essentially of a terpolymer of ethylene, propylene and butene-1, a random copolymer of ethylene and propylene or blends thereof. To the other surface of the polypropylene film will be applied the appropriate primer layer to create a bond between the polypropylene substrate and the water vapor and gas barrier layer.

Certain other multilayer film structures are known. As mentioned, U.S. Pat. No. 4,447,494, discloses an oriented heat sealable structure, comprising a polyolefin film substrate, a layer consisting essentially of a random copolymer of ethylene and propylene having from about 0.5 percent to about 6 percent by weight of ethylene on at least one surface of the substrate, a primer coating on at least one surface of the random copolymeric layer and a heat sealable layer on the primer coating. While the structure of U.S. Pat. No. 4,447,494 can be produced to yield an excellent seal range, good barrier properties, adequate bonds to polyethylene—all properties desired by the marketplace, such a structure is prone to excessive blocking, as those skilled in the art readily recognize. To combat the blocking tendency of the structures known in the art, conventional antiblocking agents are often employed. Such agents include silicon dioxide, calcium carbonate, magnesium silicate, aluminum silicate, calcium phosphate, and the like, nonanionic surfactants, anionic surfactants, polyamides, polyesters, polycarbonates, and the like. However, it has now been discovered that by forming the multilayer structure of the present invention disclosed and claimed herein, a superior packaging film having reduced blocking, as well as the aforementioned desirable properties, is produced.

Primer materials having utility in enhancing the bond between the polyolefin substrate and the water vapor and gas barrier layer include those defined in U.K. Patent No. 1,134,876 which discloses a primer produced by condensing a monoaldehyde with an interpolymer of acrylamide or methacrylamide and at least one other unsaturated monomer; and those defined in U.K. Patent No. 1,174,328 which discloses a material resulting from condensing aminoaldehyde with acrylamide or methacrylamide and subsequently interpolymerizing the condensation product with at least one other unsaturated monomer in the presence of a $C_1$-$C_6$ alkanol. A preferred primer coating resin of this type comprises a copolymer containing up to 90 percent by weight of styrene, up to 80 percent by weight of an alkyl acrylate, up to 15 percent by weight of methacrylic acid and 5 to 25 percent by weight of acrylamide which has been condensed with a solution of formaldehyde in n-butanol containing from 0.2 to 3 equivalents of formaldehyde for each amide group in the copolymer. Another primer resin of this type is a 50 percent solid solution of a copolymer resin containing 38.5 parts by weight of styrene, 44 parts by weight of ethyl acrylate, 2.5 parts of methacrylic acid and 15 parts of acrylamide which has been condensed with 5.2 parts of formaldehyde in n-butanol.

The primer material particularly preferred for use in enhancing the bond between the polyolefin substrate and the heat seal layer is the reaction product of an epoxy resin and an acidified aminoethylated vinyl polymer. The contemplated epoxy resins are glycidyl ethers of polyhydroxy compounds. Typical polyhydroxy compounds which may be used include bisphenol A, resorcinol, hydroquinone, phenol-formaldehyde, novolac resins, aliphatic diols, such as ethylene glycol, propylene glycol, 1,4-butanediol, 1,4-hexanediol, glycerol, lower alkyl hydantoins and mixtures thereof.

The preferred epoxy resins of the present invention are those made by the glycidation reaction between epichlorohydrin and bisphenol A. Epoxy resins of this type are commonly classified by their epoxy equivalent weight (EEW) which is defined as the weight of resin in grams which contains one gram equivalent of epoxy groups. Resins with an EEW ranging from 170 to 280 may be used in the present invention, but the preferred range is 180 to 210.

A variation in the composition of the epoxy resin component is one in which a hydantoin compound is substituted for the bisphenol A. For example, 1,1-dimethyl hydantoin may be employed in a low molecular weight epoxy resin since resins based on this material are completely water soluble and thereby eliminate the need for emulsification.

Although the specific structure of the epoxy resin is not critical to the primer employed in the present invention, important considerations in the selection of the epoxy resin revolve around its physical state. For example, it must be liquid and capable of being readily dispersed or dissolved with the second component or curing agent, as described below. If the epoxy resin is of low viscosity, it may be stirred directly in to the second component, however, it is preferred to employ the epoxy resin in an aqueous emulsion.

The second component in the epoxy primer is an amino modified acrylic polymer which is water soluble. This polymer is the curing agent for the epoxy compound. The preferred material is described in U.S. Pat. No. 3,719,629, the disclosure of which is incorporated by reference. This material may be generically described as an acidified aminoethylated interpolymer having pendent aminoalkylate groups. This material is produced by polymerizing acrylate, methacrylate, styrene or other suitable monomers with sufficient methacrylic or acrylic acid to give a —COOH content of about 7.5 to about 12.5 percent. Solvent polymerization techniques are preferred. The polymer is then reacted with ethyleneimine monomer and acidified with hydrochloric acid to render the polymer water soluble.

In one embodiment of the present invention, a liquid epoxy resin is emulsified in a solution of the curing agent by rapid stirring, the resultant dispersion is diluted with water to the desired concentration for coating, usually from about 2 to about 25 percent solids. When mixing the epoxy resin with the curing agent, it is generally preferred to use a stoichiometric equivalent balance of epoxy and amine groups. However, it has been found that the stoichiometric ratio may be varied over a wide range, from about one epoxy to about three amine groups through about three epoxy groups to about one amine group.

While acrylic interpolymers, such as those defined in U.S. Pat. 3,753,769, the disclosure of which is incorporated by reference in its entirety, are known to have utility as water vapor and gas barrier materials, vinylidene chloride polymer barrier materials are preferred for use in the practice of the present invention. Commercially available vinylidene chloride latexes having a vinylidene chloride monomer content of at least 50 percent may be employed, with those vinylidene chloride latexes having a vinylidene chloride monomer content of at least 75 percent preferred. Still, more particularly preferred are those latexes known as high moisture barrier polyvinylidene chlorides, that is, those polyvinylidene chloride latexes having a vinylidene chloride monomer content of at least about 90 percent. In these latex compositions, the other ethylenically unsaturated comonomers may include alpha, beta-ethylenically unsaturated acids, such as acrylic and methacrylic acids, alkyl esters containing 1 to 18 carbon atoms of the acids, such as methyl methacrylate, ethyl acrylate, butyl acrylate, and the like. In addition, alpha, beta-ethylenically unsaturated nitrile, such as acrylonitrile and methacrylonitrile can be employed.

Specific vinylidene polymer latexes contemplated can comprise about 80 percent by weight vinylidene chloride, about 17 percent by weight methylacrylate and about 3 percent by weight methacrylic acid. Alternatively, a polymer latex comprising about 82 percent by weight vinylidene chloride, about 14 percent by weight ethyl acrylate and about 4 percent by weight acrylic acid can be employed. More particularly preferred is a high barrier latex composition comprising about 92 percent by weight vinylidene chloride monomer, about 6 percent by weight methyl acrylate and about 2 percent by weight acrylic acid.

The multilayer structure of the present invention can have an overall thickness which falls within a wide range of values. Preferably, however, the structure will have an overall thickness of from about 0.5 up to about 1.75 mils. The polymeric heat sealable layer of ethylene-propylene copolymer, ethylene-propylene-butene-1 terpolymer, or blends thereof, can be present in a thickness of from about 0.02 mils to about 0.20 mils.

The primer dispersion to be applied to the surface of the polyolefin substrate can have a solids concentration of from about 0.1 percent to about 25 percent. The primer dispersion can be applied to the surface of the substrate layer utilizing standard coating techniques so that a dry coating weight of from about 0.05 to about 0.25 grams per thousand square inches (g/MSI) is obtained. A preferred range for primer coating weight is from about 0.10 to about 0.15 g/MSI. Following the coating procedure the film can subsequently be passed through a hot air oven to completely remove remaining water and/or solvent. Next, the primer coated film is coated with the water vapor and gas barrier polymer latex, using, once again, standard coating techniques. Such standard techniques include graveur, roll coating, and the like. The water vapor and gas barrier coated system can thereafter be dried by passing it through a conventional hot air oven.

Optionally, the water vapor and gas barrier material and/or the heat sealable polymeric layer material can contain a minor amount of a wax, such as a microcrystalline or carnuba wax. When a microcrystalline wax is used, it is preferred that the its softening point be less than about 200° F. The use of wax in the water vapor and gas barrier layer and/or the heat sealable polymeric layer results in several benefits to the overall multilayer film, among those being superior appearance through increased film clarity, improved film release characteristics during packaging operations as well as other improvements in the physical performance characteristics of the films, such as machining and compounding. Amounts of wax may vary from about 0.5 to about 18 weight percent of the overall water vapor and gas barrier layer and/or heat seal layer composition. Carnuba waxes are particularly preferred for use in the water vapor and gas barrier layer due to their ability to remain in suspension with the preferred polyvinylidene chloride latexes, while microcrystalline waxes are effective in the polymeric heat sealable layer and, due to their lower cost, are preferred for use therein. Suitable waxes can be obtained from many commercial suppliers. The water vapor and gas barrier layer, as well as the heat sealable polymeric layer, can also contain pigments, fillers, stabilizers, light protective agents or other suitable modifying agents if desired, as those skilled in the art would recognize.

The amount of the polyvinylidene chloride water vapor and gas barrier layer to be applied over the primer layer may be varied over a wide range depending upon the specific application and its requirements. Dry coating weights of from about 0.5 to about 6.0 g/MSI are preferred, with a coating weight range of from about 1.5 to about 3.5 g/MSI particularly preferred.

When using the multilayer films of the present invention in the packaging of certain foods, it is often desirable to laminate a second film thereto. As is a common practice in the art, extrusion lamination with polyethylene is generally employed to produce the desired lamination of the two films. When laminating the second film to the water vapor and gas barrier layer surface of the multilayer film structure of the present invention, it has been found useful to apply an adhesion promoting layer to the barrier layer surface to enhance the ability of the polyethylene to adhere to the barrier layer. Such an adhesion promoting layer can utilize the same material used to form the aforementioned water vapor and gas barrier layer, such as the preferred polyvinylidene chloride latex, to which is added a wax, such as carnuba wax, at a level of up to about 50 percent by weight or more of the overall mixture. A preferred range of adhesion promoting layer coating weights is from about 0.1 to about 3.5 g/MSI, with a coating weight range of from about 0.2 to about 1.0 g/MSI particularly preferred.

Although it is not desirable in the practice of the present invention to surface treat the outer surface of the polymeric sealing layer coextruded to the polyolefin substrate layer, it is desirable to surface treat the surface of the polyolefin substrate which is to be primed and coated with the water vapor and gas barrier layer. Such surface treatments may include the aforementioned corona discharge, flame or chemical oxidation treatments. Preferred for use in the practice of this invention are corona discharge or flame surface treatments, which can be carried out by one of the well known treatment methods. An example of a corona discharge method uses a procedure wherein a film is passed between two conductor elements which act as electrodes and a sufficiently high voltage is applied to enable corona discharges to take place. As a result of such discharges, the air above the surface of the film becomes ionized and combines with the molecules on the surface of the film so that polar incorporations are formed in the essentially nonpolar polymeric matrix.

In the examples which follow, the base films are all biaxially oriented by conventional means. In general, this includes forming the base film in sheet form and machine direction orienting (MDO) or stretching the same at the appropriate or optimum temperature, using transport rollers operating at different speeds. After the desired degree of MDO is obtained, the film is transverse direction oriented (TDO), for example, in a tentering apparatus, to impart an orientation or stretching which is at right angles to the MDO. The extent of orientation can be from about 3 to about 10 times its original dimension for the MDO and from about 3 to about lo times in the TDO.

The following specific examples are presented herein to illustrate particular embodiments of the present invention and hence are illustrative of this invention and not to be construed in a limiting sense.

EXAMPLE 1

A biaxially oriented homopolymer of isotactic polypropylene was coextruded with a random copolymer of ethylene and propylene to a thickness of approximately 0.5 to 0.6 mil. The copolymer contained about from 3 to wt. % ethylene. The copolymer had a melt flow index of about 5 g/10 minutes. Both surfaces of the coextruded film were subjected to a corona treatment of the type described above. Following corona treatment, the copolymer surface of the coextruded film was coated with the primer of Example 5 of U.S. Pat. No. 4,214,039. The primer, as previously described, is the reaction product of an acidified aminoethylated vinyl polymer and epoxy resin. The same general coating process described above and utilized in the examples of U.S. Pat. No. 4,214,039 was used to produce the film of this example. To the surface of the primer was applied an aqueous latex heat seal layer comprising a terpolymer resulting from the polymerization of about 78 wt. % of vinylidene chloride, about 18 wt.% of methyl acrylate and about 4 wt. % of methyl methacrylic acid, to which was added carnuba wax at a level of 4 to 8%. The coating was dried to yield a coating weight of approximately 2.6 g/MSI.

As may be seen by reviewing the test data presented in the Table for the Example 1 structure, this multilayer film exhibited an excellent seal range of 50° to 80° F., acceptable oxygen transmission ($TO_2$) barrier properties at 0% relative humidity (RH), adequate water vapor transmission barrier properties (WVTR) at 90% RH, adequate lamination to polyethylene (PE) bond properties, but was prone to excessive blocking. It should be noted that this level of blocking was exhibited at a rather high wax level in the polyvinylidene chloride heat seal layer of 4 to 8%.

EXAMPLE 2

A multilayer film structure identical to that described in Example 1 was produced with the exception that a high moisture barrier polyvinylidene chloride latex was substituted for the one used to form the heat seal layer of Example 1. The high moisture barrier polyvinylidene chloride latex used was a commercially available product and was comprised of a terpolymer resulting from the polymerization of about 92 wt. % of vinylidene chloride, about 6 wt % of methyl acrylate and about 2 wt. % of acrylic acid, to which was added carnuba wax at a level of 3.5%. The polyvinylidene chloride heat seal coating was dried to yield a weight of approximately 2.6 g/MSI.

As shown in the Table, barrier properties were significantly improved over those obtained with the structure of Example 1. However the seal range decreased over that of the prior example as a result of the fact that the polyvinylidene chloride becomes partially crystalline. Moreover, there is still a tendency to block to the treated polypropylene side of the structure.

EXAMPLE 3

In this example, a biaxially oriented homopolymer of isotactic polypropylene was coextruded with a terpolymer of ethylene, propylene and butene-1 to a thickness of approximately 0.5 to 0.6 mil. The terpolymer used had about 5 to 6% ethylene and about 4 to 6% butene-1 and was to provide a polymeric heat sealing layer for the overall structure. Rather than treat both surfaces of the coextruded film as was done in the previous examples, only the propylene homopolymer surface was subjected to a corona treatment of the type described above. Following corona treatment, the polypropylene homopolymer surface of the coextruded film was coated with the primer of Examples 1 and 2 using the same general coating process described above. To the surface of the primer was applied the aqueous latex polyvinylidene chloride-based material utilized in Example 2, with the exception that the level of carnuba wax utilized in the latex dispersion was less than 3%. Rather than serve as the heat sealable layer for this film, this polyvinylidene chloride-based layer served as a water vapor and gas barrier layer.

As may be seen, one manner in which the novel structure of Example 3 differs from the films of the previous examples is that both surfaces of the coextruded film are not subjected to surface treatment. Another difference resides in the fact that the coating layers are applied to the polypropylene surface of the coextrudate. Unexpectedly, this structure exhibited a greatly reduced level of blocking, as compared to the structures of Examples 1 and 2. Lower levels of wax are required to produce an acceptable product. Moreover, WVTR is significantly improved over both Examples 1 and 2, with $TO_2$ greatly improved over the value obtained from the Example 1 structure. Seal range obtained for this structure was found to be adequate, although lamination bonds to PE were found to be marginal.

EXAMPLE 4

A multilayer film structure was produced according to Example 3, to which a thin layer of high wax content high barrier polyvinylidene chloride latex was applied to the existing heat seal layer. In forming the dispersion used for this adhesion promoting layer, carnuba wax was added to the high moisture barrier polyvinylidene chloride latex of Examples 2 and 3 at a level of approximately 33 wt. %. The adhesion promoting layer was applied at a weight (dried) of approximately 0.2 g/MSI.

As indicated, the structure of this example differed from that of Example 3 only in the addition of an adhesion promoting layer. This layer, as demonstrated by the data presented in the table, greatly improved adhesion of the structure to PE when laminating. Greater than 200 g/in bond strength was obtained.

EXAMPLE 5

A biaxially oriented homopolymer of isotactic polypropylene was coextruded with a terpolymer of ethylene, propylene and butene-1 of different monomer ratios than the terpolymer used in Examples 3 and 4. The film structure was coextruded to a thickness of approximately 0.5 to 0.6 mils. The terpolymer contained from about 1 to 2 wt. % ethylene and from about 6 to 8 wt. % of butene-1. The terpolymer had a melt flow index of about 5. The coextruded structure so produced was then corona treated, primed and coated in a manner identical to that of Example 4.

As shown in the Table, the use of the heat sealing terpolymer resin described above greatly improved the seal range of the resultant structure.

TABLE

PROPERTIES OF THE MULTILAYER FILMS OF EXAMPLES 1-5

| EX NO | WVTR 90% RH 100° F. (cc/MSI/24 hrs) | $TO_2$ 0% RH 100° F. (cc/MSI/24 hrs) | BLOCKING I/O (g/in) | SEAL RANGE (°F.) | LAMINATION BOND TO PE (g/in) |
| --- | --- | --- | --- | --- | --- |
| 1 | 0.54 | 3.63 | 90 | 50-80 | 100 |
| 2 | 0.30 | 0.67 | 50 | 40-70 | 100 |
| 3 | 0.21 | 0.67 | <5.0 | 40-70 | 30 |
| 4 | 0.21 | <1.0 | <1.0 | 40-70 | >200 |
| 5 | 0.21 | <1.0 | <1.0 | 70 | >200 |

It has been determined that after the application of the primer layer, the water vapor and gas barrier layer and the optional adhesion promoting layer (if employed), it is advantageous to permit the structure to age for a certain minimum period of time in order to obtain the outstanding characteristics of the present invention. Optimum aging can be accomplished over a period of time ranging from about 25 hours to about 21 days while maintaining the film at a temperature ranging from 32°-150° F.

Although the present invention has been described with preferred embodiments, it is to be understood that modifications and variations may be resorted to without departing from the spirit and scope of this invention. Such variations and modifications are considered to be within the purview and scope of the appended claims.

What is claimed is:

1. An oriented heat sealable multilayer structure, comprising:
   (a) a substrate comprising a polyolefin film having a first surface and a second surface;
   (b) a polymeric heat sealable layer on said first surface of said substrate, said heat sealable layer comprising a polymeric material selected from the group consisting of a terpolymer of ethylene containing from about 1 to 8% by weight of ethylene and from about 1 to 8% by weight of butene-1, propylene and butene-1, said terpolymer of ethylene, propylene and butene-1, a random copolymer or ethylene and propylene, and blends thereof;
   (c) a primer coating on said second surface of said substrate; and
   (d) a water vapor and gas barrier layer on said primer coating, said water vapor and gas barrier layer selected from the group consisting of a polyvinylidene chloride containing at least about 50% by weight of vinylidene chloride monomer and an interpolymer comprising a minor amount of acrylic acid, methacrylic acid or mixtures thereof and a major amount of neutral monomer esters comprising methyl acrylate, ethyl acrylate, methyl methacrylate or mixtures thereof.

2. The multilayer structure of claim 1, wherein said polyolefin substrate comprises homopolymer polypropylene.

3. The multilayer structure of claim 2, wherein said primer comprises a member selected from the group consisting of a reaction product of an acidified aminoethylated vinyl polymer and an epoxy resin, the condensation product of a monoaldehyde with an interpolymer of an acrylamide or methacrylamide and at least one unsaturated monomer, and a condensation product of aminoaldehyde with acrylamide or methacrylamide interpolymerized with at least one other unsaturated monomer in the presence of a $C_1$-$C_6$ alkanol.

4. The multilayer structure of claim 3, wherein said second surface of said substrate is surface treated using a surface treatment technique selected from the group consisting of flame treatment and corona discharge treatment.

5. The multilayer structure of claim 4, wherein said water vapor and gas barrier layer comprises a polyvinylidene chloride containing at least about 90% by weight of vinylidene chloride monomer.

6. The multilayer structure of claim 5, wherein said water vapor and gas barrier layer further comprises a carnuba wax at a level of from about 0.5 to about 15% by weight.

7. The multilayer structure of claim 6, wherein said water vapor and gas barrier layer further comprises a carnuba wax at a level of from about 0.5 to about 5% by weight.

8. The multilayer structure of claim 6, further comprising an adhesion promoting layer on said water vapor and gas barrier layer comprising from about 25% to about 90% by weight of a member selected from the group consisting of a polyvinylidene chloride containing at least about 50% by weight of vinylidene chloride monomer and an interpolymer comprising a minor amount of acrylic acid, methacrylic acid or mixtures thereof and a major amount of neutral monomer esters comprising methyl acrylate, ethyl acrylate, methyl methacrylate or mixtures thereof, and from about 10% to about 75% by weight of wax.

9. The multilayer structure of claim 1, further comprising an adhesion promoting layer on said water vapor and gas barrier layer comprising from about 25% to about 90% by weight of a member selected from the group consisting of a polyvinylidene chloride containing at least about 50% by weight of vinylidene chloride monomer and an interpolymer comprising a minor amount of acrylic acid, methacrylic acid or mixtures thereof and a major amount of neutral monomer esters comprising methyl acrylate, ethyl acrylate, methyl methacrylate or mixtures thereof, and from about 10% to about 75% by weight of wax.

10. A method for producing an oriented heat sealable multilayer structure, comprising:
    (a) coextruding a substrate comprising a polyolefin film with a polymeric heat sealable layer the polymeric heat sealable layer comprising a material selected from the group consisting of a terpolymer of ethylene, propylene and butene-1, said terpolymer of ethylene, propylene and butene-1 containing from about 1 to 8% by weight of ethylene and from about 1 to 8% by weight of butene-1 a random copolymer of ethylene and propylene, and blends thereof;
    (b) biaxially orienting the coextrudate;
    (c) applying a primer coating on the surface of the polyolefin substrate; and
    (d) applying a water vapor and gas barrier layer on the primer coating, the water vapor and gas barrier layer selected from the group consisting of a polyvinylidene chloride containing at least about 50% by weight of vinylidene chloride monomer and an interpolymer comprising a minor amount of acrylic acid, methacrylic acid or mixtures thereof and a major amount of neutral monomer esters comprising methyl acrylate, ethyl acrylate, methyl methacrylate or mixtures thereof.

11. The method of claim 10, wherein in step (a) the polyolefin substrate comprises homopolymer polypropylene.

12. The method of claim 11, wherein in step (c) the primer comprises a member selected from the group consisting of a reaction product of an acidified aminoethylated vinyl polymer and an epoxy resin, a condensation product of a monoaldehyde with an interpolymer of an acrylamide or methacrylamide and at least one unsaturated monomer, and a condensation product of aminoaldehyde with acrylamide or methacrylamide interpolymerized with at least one other unsaturated monomer in the presence of a $C_1$-$C_6$ alkanol.

13. The method of claim 12, further comprising the step of surface treating the polyolefin substrate surface of the coextrudate prior to step (c) using a surface treatment technique selected from the group consisting of flame treatment and corona discharge treatment.

14. The method of claim 13, wherein in step (d) the water vapor and gas barrier layer comprises a polyvinylidene chloride containing at least about 90% by weight of vinylidene chloride monomer.

15. The method of claim 14, wherein in step (d) the water vapor and gas barrier layer further comprises a carnuba wax at a level of from about 0.5 to about 15% by weight.

16. The method of claim 15, wherein in step (d) the water vapor and gas barrier layer further comprises a carnuba wax at a level of from about 0.5 to about 5% by weight.

17. The method of claim 15, wherein in step (a) the terpolymer of ethylene, propylene and butene-1 contains from about 1 to 8% by weight of ethylene and from about 1 to 8% by weight of butene-1.

18. The method of claim 17, further comprising the step of applying an adhesion promoting layer on the water vapor and gas barrier layer, the adhesion promoting layer comprising from about 25% to about 90% by weight of a member selected from the group consisting of a polyvinylidene chloride containing at least about 50% by weight of vinylidene chloride monomer and an interpolymer comprising a minor amount of acrylic acid, methacrylic acid or mixtures thereof and a major amount of neutral monomer esters comprising methyl acrylate, ethyl acrylate, methyl methacrylate or mixtures thereof, and from about 10% to about 75% by weight of wax.

19. The method of claim 10, further comprising the step of applying an adhesion promoting layer on the water vapor and gas barrier layer, the adhesion promoting layer comprising from about 25% to about 90% by weight of a member selected from the group consisting of a polyvinylidene chloride containing at least about 50% by weight of vinylidene chloride monomer and an interpolymer comprising a minor amount of acrylic acid, methacrylic acid or mixtures thereof and a major amount of neutral monomer esters comprising methyl acrylate, ethyl acrylate, methyl methacrylate or mixtures thereof, and from about 10% to about 75% by weight of wax.

* * * * *